US009195633B2

(12) United States Patent
Enami et al.

(10) Patent No.: US 9,195,633 B2
(45) Date of Patent: Nov. 24, 2015

(54) IN-VEHICLE OPERATION APPARATUS

(71) Applicant: DENSO CORPORATION, Kariya, Aichi-pref. (JP)

(72) Inventors: Kazuya Enami, Kariya (JP); Takao Muroi, Owariasahi (JP); Hiroaki Sasaki, Chiryu (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 302 days.

(21) Appl. No.: 13/759,341

(22) Filed: Feb. 5, 2013

(65) Prior Publication Data

US 2013/0204459 A1 Aug. 8, 2013

(30) Foreign Application Priority Data

Feb. 7, 2012 (JP) .................................. 2012-024314

(51) Int. Cl.
*G06F 17/00* (2006.01)
*B60K 37/06* (2006.01)
*B60K 35/00* (2006.01)
(Continued)

(52) U.S. Cl.
CPC ................ *G06F 17/00* (2013.01); *B60K 35/00* (2013.01); *B60K 37/06* (2013.01); *B60R 16/0231* (2013.01); *G06F 3/0482* (2013.01); *G06F 3/04886* (2013.01); *B60K 2350/1004* (2013.01); *B60K 2350/1028* (2013.01);
(Continued)

(58) Field of Classification Search
CPC B60R 16/023; B60R 16/0231; B60R 16/037; B60K 37/06
See application file for complete search history.

(56) References Cited

U.S. PATENT DOCUMENTS 4,731,769 A * 3/1988 Schaefer et al. ................ 701/36
4,787,040 A * 11/1988 Ames et al. ....................... 701/1
(Continued)

FOREIGN PATENT DOCUMENTS

JP 10-308136 11/1998
JP 2001-175397 6/2001
(Continued)

OTHER PUBLICATIONS

Office action dated Jan. 14, 2014 in corresponding Japanese Application No. 2012-024314.
(Continued)

*Primary Examiner* — Helal A Algahaim
*Assistant Examiner* — Dale W Hilgendorf
(74) *Attorney, Agent, or Firm* — Harness, Dickey & Pierce, P.L.C.

(57) ABSTRACT

An in-vehicle operation apparatus has an operation switch, a candidate selection operation unit, and a command assignment operation unit, all of which are operable by a user. The operation switch may control multiple in-vehicle devices based on a desired command assigned thereto. In particular, the candidate selection operation unit selects a plurality of candidate commands from among a plurality of commands respectively for in-vehicle devices. The command assignment operation unit selects and assigns the desired command from among the plurality of candidate commands to the operation switch. Accordingly, the operation switch controls the in-vehicle device associated with the desired command. Thus, the apparatus reduces the amount of operation switches required and allows the user to easily select and assign a command to the operation switch for controlling a desired in-vehicle device.

5 Claims, 8 Drawing Sheets

(51) Int. Cl.
*G06F 3/0482* (2013.01)
*G06F 3/0488* (2013.01)
*B60R 16/023* (2006.01)
*B60R 16/037* (2006.01)

(52) U.S. Cl.
CPC ...... *B60K 2350/1036* (2013.01); *B60R 16/023* (2013.01); *B60R 16/037* (2013.01)

(56) References Cited

U.S. PATENT DOCUMENTS

| | | | |
|---|---|---|---|
| 6,009,355 A * | 12/1999 | Obradovich et al. | 701/1 |
| 6,256,558 B1 * | 7/2001 | Sugiura et al. | 701/36 |
| 6,650,345 B1 * | 11/2003 | Saito et al. | 715/764 |
| 7,895,530 B2 * | 2/2011 | Leavitt et al. | 715/810 |
| 2004/0122572 A1 * | 6/2004 | Ichinose | 701/36 |
| 2004/0150674 A1 | 8/2004 | Takahashi et al. | |
| 2006/0227066 A1 * | 10/2006 | Hu et al. | 345/7 |
| 2007/0052545 A1 * | 3/2007 | Le Gallic | 340/815.4 |
| 2007/0234223 A1 * | 10/2007 | Leavitt et al. | 715/762 |
| 2007/0244613 A1 * | 10/2007 | Ishikawa et al. | 701/34 |
| 2011/0082615 A1 * | 4/2011 | Small et al. | 701/29 |

FOREIGN PATENT DOCUMENTS

| | | | |
|---|---|---|---|
| JP | 2004-251756 | | 9/2004 |
| JP | 2007-008246 | | 1/2007 |
| JP | 4148738 B2 | | 9/2008 |
| JP | 4182769 B2 | | 11/2008 |
| JP | 2008-296608 | | 12/2008 |
| JP | 2009-129188 | | 6/2009 |
| JP | 201 01 0561 | * | 5/2010 |
| JP | 2010-105610 | | 5/2010 |

OTHER PUBLICATIONS

Office Action dated Dec. 25, 2014 in corresponding Chinese No. 2013 10045454.6.

* cited by examiner

FIG. 9A  AUDIO

FIG. 9B  TV

FIG. 9C  HVAC

IN-VEHICLE OPERATION APPARATUS

CROSS-REFERENCE TO RELATED APPLICATION

This application is based on and claims the benefit of priority of Japanese Patent Application No. 2012-24314 filed on Feb. 7, 2012, the disclosure of which is incorporated herein by reference.

TECHNICAL FIELD

The present disclosure generally relates to an in-vehicle operation apparatus that provides a common operation switch for controlling operations of multiple in-vehicle devices.

BACKGROUND

A vehicle may include a common operation switch that controls multiple in-vehicle devices in a unified manner and reduces the number of operation switches that would be operated by a user. Specifically, a simple operation switch may allow the user to select and search through a hierarchy of command menus for each of the in-vehicle devices available through an interface displayed on a screen. Such a common operation switch is disclosed in, for example, Japanese Patent Laid-Open No. 2007-8246 (JP '246).

For instance, a top menu in the hierarchy would allow the user to select one operation target device from among the in-vehicle devices available, such as a navigation device, an audio system, a television, a radio, and an air-conditioner. After selecting, for example, a television in such menu, a television menu would appear to allow the user to input a TV operation, such as a volume control and a channel selection. After selecting a channel selection, a bottom menu in the hierarchy would appear, allowing the user to select a desired channel. The user would then select a desired channel (i.e., a desired command), which is displayed in a menu on the screen.

In such a case, an input operation performed by the user (e.g., a driver of the vehicle) via the operation switch may be very simple for enabling the driver to perform a quick selection of one option from among many options or commands. By providing the quick selection, the driver is able to operate the in-vehicle device while driving the vehicle.

However, simply providing many options and choices for the disposal of the user may not assist in quick selection. In other words, a menu with too many options may distract the driver from driving the vehicle for a prolonged period of time by requiring too many switch operations.

SUMMARY

In an aspect of the present disclosure, an in-vehicle operation apparatus includes: an operation switch, a candidate selection operation unit, and a command assignment operation unit.

The operation switch is operable by the user for controlling multiple in-vehicle devices based on a desired command assigned thereto. In particular, the candidate selection operation unit, which is operable by the user, selects multiple candidate commands from among multiple commands respectively for the in-vehicle devices. The command assignment operation unit, which is also operable by the user, selects and assigns the desired command from among the multiple candidate commands to the operation switch, thereby allowing the operation switch to control the in-vehicle device associated with the desired command.

According to the present disclosure, the user that operates the in-vehicle device, such as an occupant of the vehicle, may assign a frequently used command to the operation switch, thereby allowing the operation switch to function as a shortcut key. Therefore, the user is enabled to perform only a few operations to quickly select the desired command, and such operation scheme achieves the ease of operating a device even in a traveling vehicle.

Here, the frequently used commands may vary depending on the environment and/or user preference. For example, in seasons where the temperature of the outside air greatly differs from comfortable temperature, the air-conditioner (i.e., Heat Ventilation Air-Conditioning (HVAC) system) is frequently used. Further, the frequency at which an audio device or, even, operations related to changing sound levels may vary user to user. Therefore, even in a traveling vehicle, the ability to change the assignment of the desired command to the operation switch may be needed. For accommodating such a need, the assignment operation for assigning the desired command to the operation switch needs to be performable in a very short time.

In view of such a need, the in-vehicle operation apparatus of the present disclosure allows the user to pre-select candidate commands from among all of the available commands (i.e., objects of candidate selection), and then allows the user to make a final selection, that is, selection of the desired command that is actually assigned to the operation switch. Therefore, by pre-performing a candidate selection at a free time, e.g., at a stop time of the vehicle, or at an engine stop time, the driver in the travel time of the vehicle is only required to make a final command selection from among the "sifted" commands, i.e., from among the candidate commands. Therefore, in comparison to the selection of an assigned command from among all available commands, such a pre-selection plus final selection scheme reduces a selection time for selecting the assigned command, which makes it safer and more beneficial for the user who is making the change of the assigned command in a traveling vehicle.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

A variety of embodiments of an in-vehicle operation apparatus regarding the present disclosure are described in the following with reference to the drawings. In the following embodiments, like parts have like numbers, and the description of like parts will not be repeated.

(First Embodiment)

Figure 1:
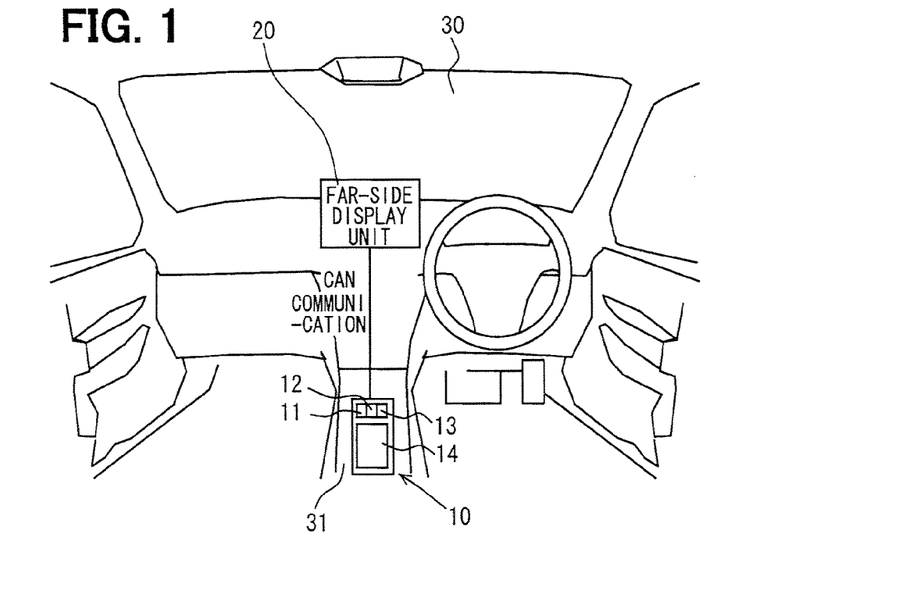
FIG. 1 is an illustration of a remote operation apparatus 10 of the in-vehicle operation apparatus in a first embodiment of the present disclosure.

With reference to FIG. 1, a remote operation apparatus 10 is disposed in a vehicle within a reach range of a hand of a driver (i.e., a user). Information is displayed on a far-side display unit 20 (i.e., display unit 20 for brevity). The display unit 20 is installed in proximity to a front windshield 30. The remote operation apparatus 10 is installed in a panel 31 (i.e., a disposition member) of a center console that is located between a driver seat and a passenger seat. The remote operation apparatus 10 and the display unit 20 have separate bodies, and are separately disposed, and the position of the display unit 20 is higher than the position of the remote operation apparatus 10.

By having a separate arrangement of the remote operation apparatus 10 and the display unit 20, the driver does not have to substantially move his/her eyes (i.e., a look direction) when he/she looks at the display unit 20 while driving the vehicle. In other words, the driver is able to glance over at the display unit 20, and may not have to fully avert their eyes from the road. Further, the driver is able to operate the remote operation apparatus 10 and still maintain his/her posture while driving the vehicle, because the remote operation apparatus 10 is positioned close to the driver's hand.

Figure 2:
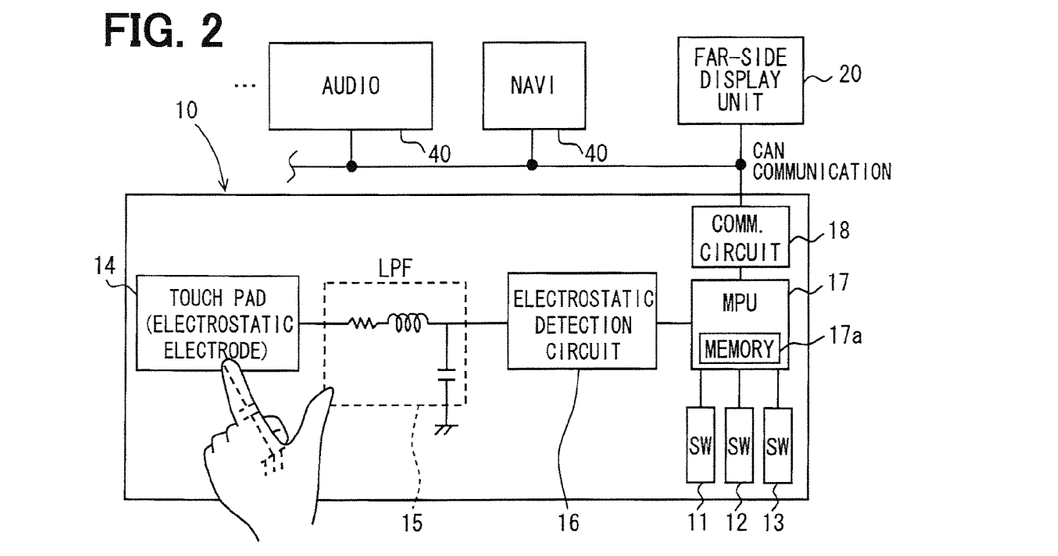
FIG. 2 is a block diagram of the remote control apparatus 10 of FIG. 1.

With reference to FIG. 2, the remote operation apparatus 10 is a device for operating a plurality of in-vehicle devices 40 installed in the vehicle by operating a device control menu that controls operation of the in-vehicle device. A few examples of the in-vehicle devices 40 include a navigation apparatus, an audio device, a television, a radio, and an air conditioner, which are installed in the vehicle. Also, a play or fast-forward operation for the audio device are examples of operation contents of the audio device that are displayed in the device control menu.

Operation contents of the in-vehicle devices 40 are displayed on the display unit 20, as well as operation conditions of the devices 40 and operation menus, which are commands that are selectable and operable by the user by way of the remote operation apparatus 10.

The remote operation apparatus 10 has plural operation switches 11, 12, 13 and a touch pad 14 that are operable by the user. The operation switches 11, 12, 13 are mechanical switches in which a terminal contact condition is turned on and off by a press operation of the user. The terminal contact condition may be arranged in a row along a vehicle right-left direction (i.e., a right-left direction of FIG. 1). The operation switches 11, 12, 13 may respectively be operated by a ring (i.e., a third) finger, a middle (i.e., a second) finger, and a forefinger (i.e., a first finger) on the left hand of the driver when the vehicle is manufactured for left-side traffic, such as in Japan. The operation switches 11, 12, 13 may similarly be arranged for the right hand of the driver when the vehicle is manufactured for right-side traffic, such as in the United States of America.

The touch pad 14 is disposed next to the operation switches 11 to 13. The touch pad 14 may be positioned on the lower part of the remote operation apparatus 10 below the operation switches 11, 12, 13 (FIG. 1).

Figures 4A, 4B, 4C, 4D:
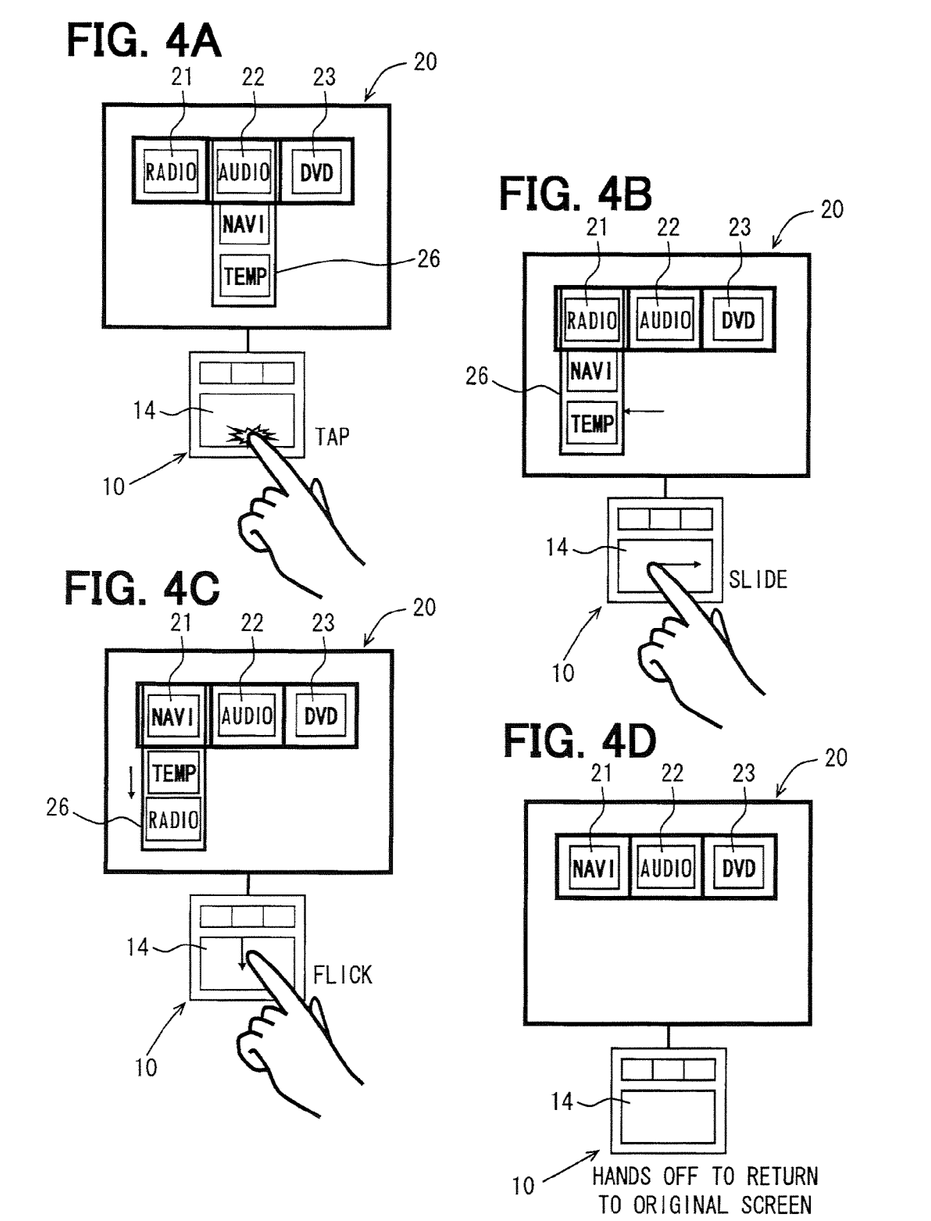
FIGS. 4A, 4B, 4C, 4D are illustrations of an assignment change mode in the first embodiment of the present disclosure.

The touch pad 14 detects a movement of the driver's finger on an operation plate based on a change of capacitance. Specifically, the touch pad may detect various operations, such as a contact position and a trace movement performed by the movement of the driver's finger on the operation plate, as well as a tap operation in which the operation plate is tapped by the finger (FIG. 4A), a slide operation in which the finger is moved to a target position (FIG. 4B), and a flick operation in which the finger is flicked on the operation plate (FIG. 4C). The tap operation may also be detected by having a pressure sensor in the operation plate of the touch pad 14.

The operation switches 11, 12, 13 and the touch pad 14 may be blindly operated by the user. In other words, the user may operate the remote operation apparatus without looking at his/her finger or hand. Instead, the user may simply look at an operation menu displayed on the display unit 20 to perform a required operation for controlling the device 40.

The remote operation apparatus 10 also includes a filter circuit 15, an electrostatic detection circuit 16, a microprocessor unit (MPU) 17, and a communication circuit 18 (FIG. 2). The touch pad 14 outputs, as a finger operation signal, the capacitance change that is caused by the finger. The filter circuit 15 removes the noise from the finger operation signal, and then provides the noise free finger operation signal to the electrostatic detection circuit 16. The electrostatic detection circuit 16 outputs the finger operation signal as a serial signal to the MPU 17.

The MPU 17 generates and outputs an operation signal based on the finger operation signal outputted from the electrostatic detect circuit 16 and an ON-OFF signal output from the operation switches 11, 12, 13. The communication circuit 18 allows a two-way communication between the display unit 20, the devices 40, and the MPU 17 by a communication protocol such as a Controller Area Network (CAN). Accordingly, the operation signal from the MPU 17 is transmittable to the display unit 20 and the devices 40.

The display unit 20 and various devices 40 operate according to the control contents specified by the operation signal.

The MPU 17 may function as an assignment control unit to assign a command to each of the operation switches 11, 12, 13. Upon having an ON operation on one of the operation switches 11, 12, 13, the operation signal that instructs an execution of an assigned command that is assigned to the operation switch is outputted. In other words, when the user operates (e.g. presses) one of the operation switch 11, 12, 13, an operation signal associated with the execution of the assigned command assigned therein is outputted.

Further, the MPU 17 may function as a display control unit to control the information displayed on the display unit 20. In particular, as the display control unit, the MPU 17 controls the display of the operation menu on the display unit 20 according to the operation signal.

In the following, the information displayed and the assignment of the command are described with reference to FIG. 3 to FIG. 6.

Figure 3A:
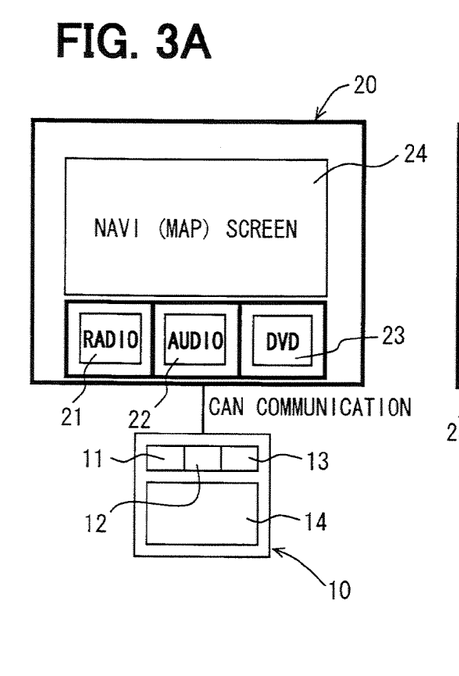
FIGS. 3A, 3B are illustrations of a normal display mode of the present disclosure.

FIG. 3A shows a situation in which none of the in-vehicle devices 40 set in the operation menu are being used, which is provided in a normal display mode. The MPU 17 controls the display unit 20 to set and display an assignment display areas 21, 22, 23 and a navigation display area 24. The assignment display areas 21, 22, 23, or command slots 21, 22, 23, are display areas for displaying commands that are respectively assigned to the operation switches 11, 12, 13. The text displayed by the command slots 21, 22, 23 for indicating the command assigned to the operation switches 11, 12, 13 are predetermined. The command slots 21, 22, 23 may also be referred to as the operation menu, which are operable by the user. The navigation display area 24 is an area in which map information from the navigation apparatus is displayed.

In the example of FIG. 3A, a command to start a radio, a command to start an audio system and a command to start a DVD player are respectively assigned to the operation switches 11, 12, 13, and such commands are displayed in the command slots 21, 22, 23.

Upon receiving an ON operation to the operation switch 13 from the user, the operation signal associated with the command assigned to the operation switch 13, (i.e., an audio startup command), is outputted. In other words, when the user operates (e.g. presses) the operation switch 13, an operation signal associated with the audio startup command assigned to the operation switch 13 is outputted. The operation signal is then received by the audio device 40, and the audio device 40 is turned on.

Figure 3B:
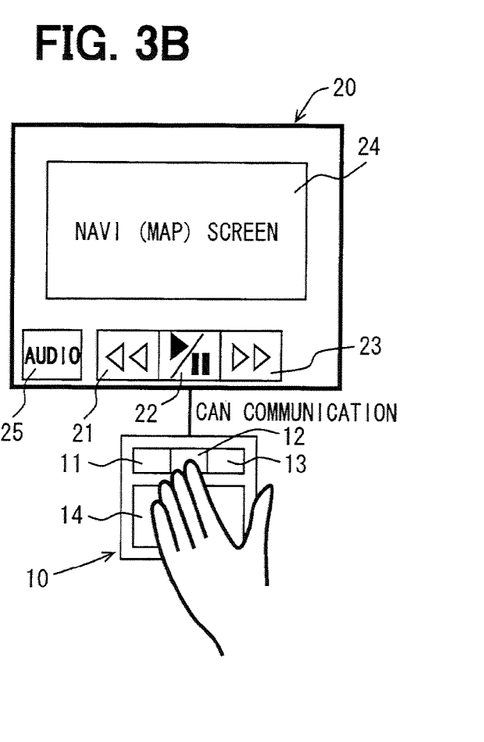

In FIG. 3B, when the device 40 in the operation menu (i.e., one of the command slots 21, 22, 23) is being used, such as the audio device 40, the MPU 17 controls the display unit 20 to set and display an active application display area 25, in which the application currently being used appears. Further, the MPU 17 changes the commands assigned to the operation switches 11, 12, 13 to the predetermined commands associated with the device 40 being used.

The predetermined commands associated with the operation of the device 40 being used are set to the command slots 21, 22, 23. For instance, for the audio device 40, which is the device 40 currently being used, a rewind command, a play/pause command, and a fast-forward command are respectively assigned to the operation switches 11, 12, 13 and are displayed in the command slots 21, 22, 23.

To access an assignment change mode, a predetermined operation associated with the assignment change mode (e.g., a tap operation) is detected by the operation switches 11, 12, 13 or by the touch pad 14 and the MPU 17 changes the display contents of the display unit 20 to the assignment change mode (FIG. 4A). In the assignment change mode, the commands assigned to the operation switches 11, 12, 13 can be changed according to an operation of the touch pad 14 (i.e., a command assignment operation unit in claims).

In the assignment change mode, multiple candidate commands are displayed as available commands that can be assigned to the operational switches 11, 12, 13. The candidate commands are set by the user in advance. Specifically, the commands currently assigned to the operational switches 11, 12, 13 (i.e., assigned commands) are displayed in the command slots 21, 22, 23, and commands that are available (i.e., candidate commands), which are not assigned to any one of the operation switches 11, 12, 13, are displayed in a candidate display area 26. The information displayed (i.e., multiple candidate commands) on the display unit in the assignment change mode may be referred to as a second operation screen in the claims. In addition, the assignment change mode, which may include the function of the touch pad 14 and the MPU 17, may be referred to as a command assignment operation unit in claims.

In the example of FIG. 4A, the candidate commands include a command to operate the navigation apparatus, and a command to control the temperature. The command for controlling temperature may be to set a temperature to which the vehicle compartment is adjusted via the vehicle HVAC. The candidate commands for the navigation apparatus and the temperature are displayed in the candidate display area 26 as "Navi" and "TEMP" respectfully.

In the assignment change mode, the user selects one of the operation switches 11, 12, 13, which is to have its assigned command changed, by operating the touch pad. In the example of FIG. 4B, a slide operation is performed on the touch pad 14 to select the operation switch 11, 12, 13 that is a target of the assignment change. As a result, the position of the candidate display area 26 on the display unit 20 is moved according to the slide operation. In particular, the position of the candidate display area 26 moves to a position that is next to the assignment display area 21 of the operation switch 11. Therefore, the operation switch 11 becomes the target of the assignment change.

In the assignment change mode, a new command is assigned to the target of the assignment change, which is the operation switch 11 in this example, by an operation of the touch pad 14. In the example of FIG. 4C, a flick operation on the touch pad 14 is performed to change the assigned command of the operation switch 11, and the command displayed in the assignment display area 21 is also changed. In addition, when the flick operation is performed, a drum of commands (i.e., a drum shape command selection menu having the candidate display area 26 and the assignment display area 21) is rotated. For example, per the flick operation in FIG. 4C, the assignment display area 21 is changed from "Radio" to "Navi" by moving "Navi" to the assignment display area 21, and moving "Radio" to the end of the candidate display area 26, such that it appears that "Radio" and "Navi" rotated into their respective new positions.

If contact by the finger is not detected over a predetermined period, the assignment change mode is switched to the normal display mode (e.g., FIGS. 3A and 3B). In the normal display mode, the command slots 21, 22, 23 (FIG. 4D or FIG. 3A) are displayed, and the candidate display area 26 is no longer shown.

Figure 5:
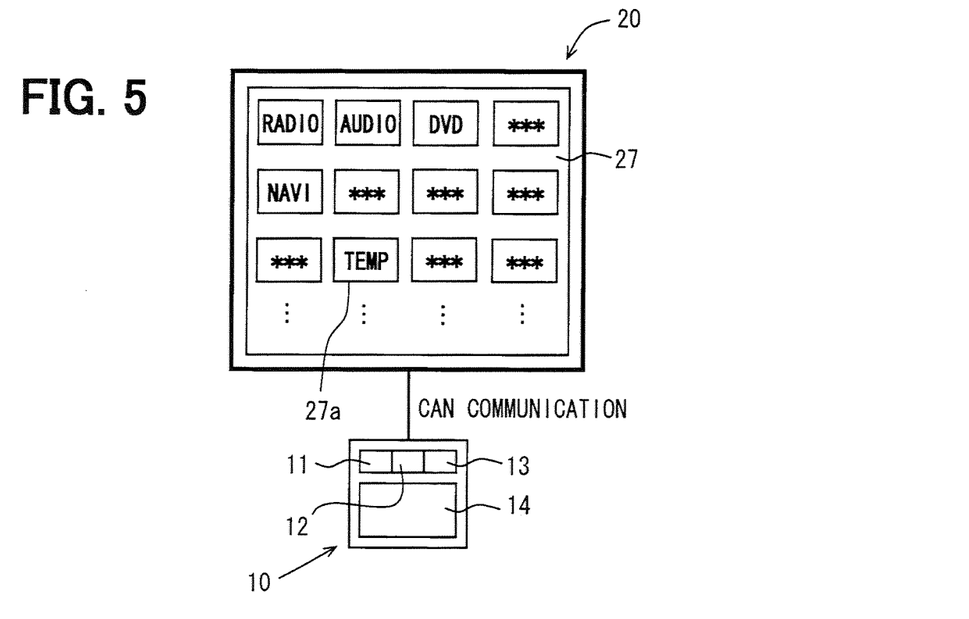
FIG. 5 is an illustration of a candidate registration mode in the first embodiment of the present disclosure.

To access a candidate registration mode, a predetermined operation associated with the candidate registration mode (e.g., a repeated tap operations) is detected by the operation switches 11 to 13 or by the touch pad 14 (i.e., a candidate selection operation unit in claims) and the MPU 17 switches the information displayed on the display unit 20 to the candidate registration mode (FIG. 5). The information displayed (i.e., list of selectable commands) on the display unit in the candidate registration mode may be referred to as a first operation screen in the claims.

In the candidate registration mode, all selectable commands that may serve as a candidate command, which includes the currently assigned commands, are displayed in an all command display area 27. In the candidate registration mode, the user is able to set the candidate commands that can be selected in the assignment change mode, and, therefore, appear in the candidate display area 26. When a command is selected from all of the commands display in the all command display area, the command selected may be emphasized by adding a highlight, thereby indicating that the command selected is set as the candidate command. The selection of the candidate command from among all of the commands in the all command display area 27 may be determined by the slide operation on the touch pad 14.

The MPU 17 prohibits accessing the candidate registration mode in a traveling vehicle. Therefore, the selection and the setting of the candidate commands is allowed only when the vehicles is stopped (i.e., at a vehicle stop time). Switching the display to the normal display mode and to the assignment change mode is allowed even in the traveling vehicle.

The operation menu has a hierarchical structure. A menu for selecting a target operation device (i.e., the in-vehicle device 40 to be operated) is displayed in an upper-most menu level (FIG. 3A). Upon selecting the target operation device, a menu displaying the operation contents for controlling the target operation device selected is displayed (FIG. 3B). The menu for selecting a target operation device may be referred to as an application selection menu and the menu displaying the operation contents for controlling the target operation device selected may be provided as a device control menu.

In FIGS. 4 and 5, an application selection menu is displayed and is used to describe changing an application start command via the assignment change mode and the candidate registration mode. In addition to changing the application start command by the application selection menu, commands for operating or controlling an active device (i.e., the target operation device) may also be changed by displaying the device control menu. In other words, the commands (i.e., the operation contents) for controlling the active device may be changed via the assignment change mode.

Figure 6:
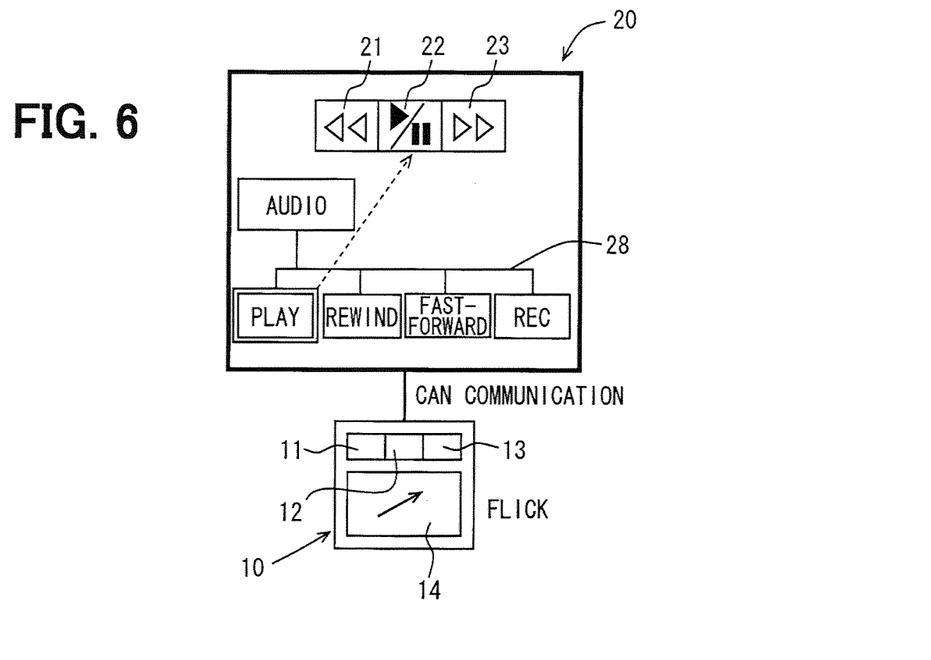
FIG. 6 is an illustration of the assignment change mode of a device control menu in the first embodiment of the present disclosure.

For instance, with reference to FIG. 6, the device control menu displays a command display area 28, which provides all the commands for the active device, in addition to the command slots 21, 22, 23. By performing a slide operation on the touch pad 14, the command corresponding to the slide position is selected as a change target from among the commands in the command slots 21, 22, 23. Then, by performing a flick operation on the touch pad 14, the command already assigned to the operation switch 12, which been selected as the change target by the slide operation, is changed to a new command that is in accordance with the flick operation. Accordingly, the command displayed in the command slot 22 is changed to the new command.

Further, as shown by a numeral 27a in FIG. 5, operation commands of the active application (e.g., a temperature control command for controlling a temperature setting) may be displayed in the application selection menu. By simultaneously displaying commands in different menu levels, that is, application selection commands and operation commands, the assigned commands may be selected from different levels.

A display contents change procedure for changing information (i.e., contents) of the display unit 20 under control of the MPU 17 is described with reference to flowcharts in FIGS. 7 and 8. The process of FIGS. 7 and 8 may be performed at predetermined intervals while an operation electric power is supplied for the MPU 17.

Figure 7:
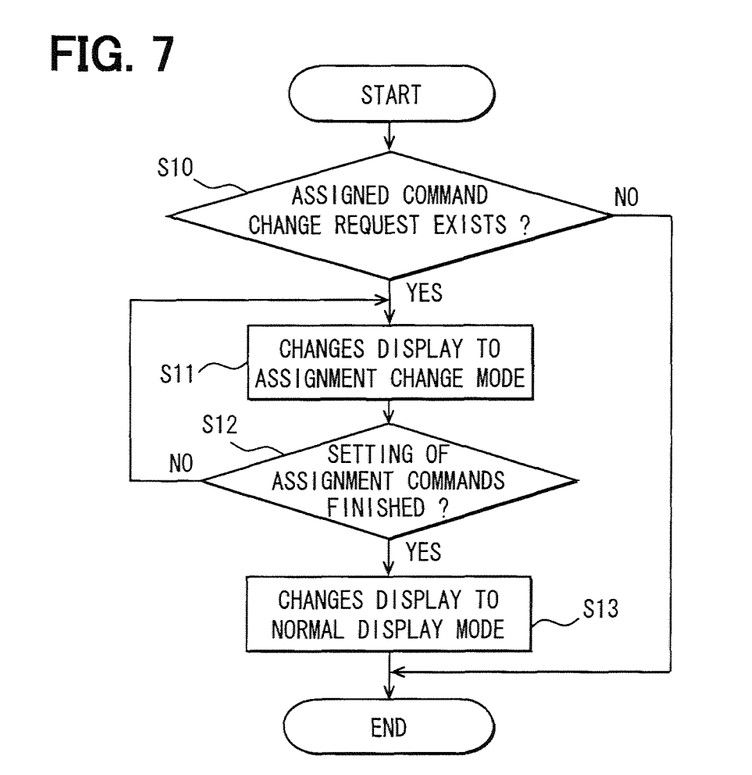
FIG. 7 is a flowchart of a display control procedure of the assignment change mode of the present disclosure.

With reference to FIG. 7, the MPU 17 determines whether the assignment change mode is being accessed at S10. For instance, the MPU 17 may determine that a change request of an assigned command exists (i.e., the assignment change mode is requested) when a tap operation is detected in the normal display mode.

At S11, the MPU 17 changes the information displayed on the display unit 20 from the one in the normal display mode (FIG. 3) to the one in the assignment change mode (FIG. 4A). Subsequently, the MPU 17 determines, at S12, whether a setting of the assigned command is finished in the assignment change mode. For instance, in the example of FIG. 4D, when contact by the finger on the touch pad 14 is not detected for a time longer than a predetermined period, the MPU 17 determines that the assigned command setting is finished (S12:Yes). The MPU 17 continues to display the display unit 20 in the assignment change mode until the setting of assignment commands is finished (S12:NO). Upon determining that the setting of assignment commands is finished, the MPU 17, at S13, switches the display from the assignment change mode to the normal display mode.

Figure 8:
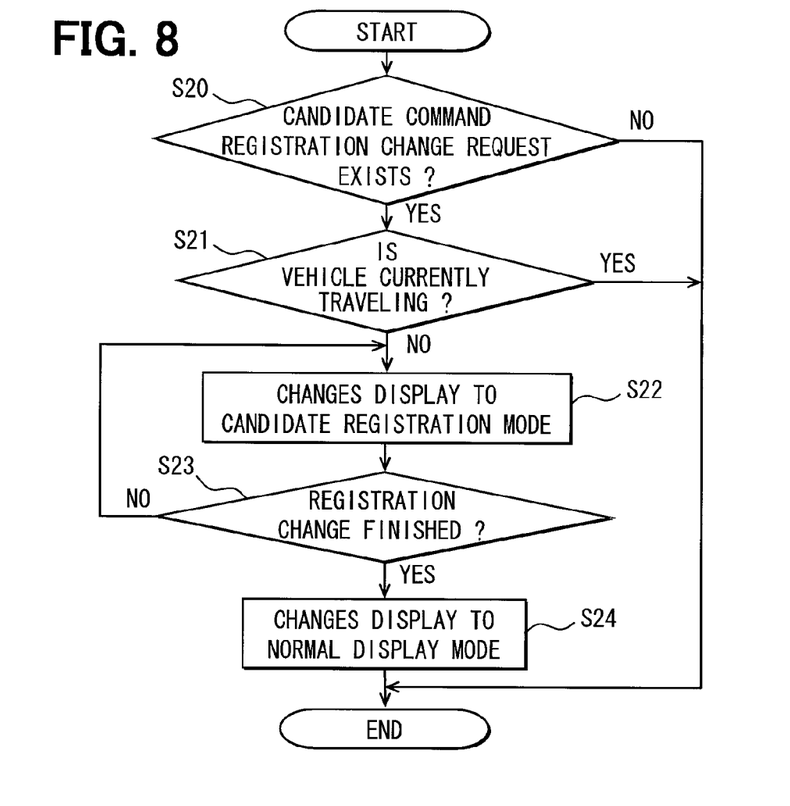
FIG. 8 is a flowchart of a display control procedure of the candidate registration mode of the present disclosure.

With reference to FIG. 8, the MPU 17 determines, at S20, whether a registration change request of a candidate command exists, or, in other words, whether the candidate registration mode is being accessed. For instance, the MPU 17 may determine that a change request of a candidate command exists when a repeated tap operations is detected in the normal display mode (S20:Yes).

If the change request of the candidate command exists, the MPU 17, at S21, determines whether the vehicle is traveling. If the vehicle is traveling (S21:YES), the MPU 17 finishes the process without changing the display to the candidate registration mode. On the other hand, if the vehicle is not traveling (S21:NO), the MPU 17, at S22, changes the display contents of the display unit 20 to the candidate registration mode (FIG. 5).

The display in the candidate registration mode continues until it is determined that the registration change is finished at S23. After determining that the registration change is finished (S23:Yes), the MPU 17, at S24, changes the display from the candidate registration mode to the normal display mode.

According to the present embodiment, the following effects are achieved.

The commands for starting and controlling an application, such as an in-vehicle device 40, which may be frequently used, are assigned to the operation switches 11, 12, 13, thereby allowing the operation switches 11, 12, 13 to be serving as shortcut keys. The user is, therefore, enabled to perform only a few operations to quickly select a desired application or command, and achieve the ease of device operation in a traveling vehicle.

In the candidate registration mode, multiple candidate commands are selected and registered from among all available commands. The candidate commands are then used in the assignment change mode to change the assigned command of the operation switch to one of the candidate commands. In addition, the candidate registration mode may only be accessed when vehicle is stopped, thereby allowing the user sufficient amount of time to set the candidate commands. By performing the pre-registration of the candidate commands at a stop time of the vehicle, the candidate command, which is selected, may be selected from among a fewer number of pre-registered candidate commands at a travel time of the vehicle. In other words, the time required to change the assigned command of the operation switch may be decreased by providing a short list of candidate commands from which the user may select during a travel time of the vehicle, which is more safe and desirable in comparison to presenting a long list of all of the available commands.

The user operability of the remote operation apparatus 10 is improved, in comparison to the operation under a voice only guidance without having displayed guidance. For instance, operability is improved by displaying all available commands (i.e., objects of candidate command selection) on the display unit 20, which are selectable by using the touch pad 14. In addition, operability is improved by displaying the multiple candidate commands on the display unit 20, after the selection of the multiple candidate commands by using the touch pad 14.

Further, in the present embodiment, the display unit 20 and the remote operation apparatus 10 are separately disposed at two separate positions, the display unit 20 is positioned to be within a look direction of the driver and the remote operation apparatus 10 is positioned close to the driver (i.e., within the reach of the driver). Therefore, the user's operability is improved by allowing the driver to look or glance at the displayed guidance to visually confirm the operation performed via the remote operation apparatus 10.

The touch pad 14 may serve as a candidate selection operation unit for selecting and setting a candidate command, and may also serve as a command assignment operation unit for selecting an assigned command from among the candidate commands selected. Specifically, the touch pad 14 may receive various operations, such as a tap/slide/flick operation on an input plate of the touch pad 14, which allows the user to select and set such commands. Therefore, by employing the touch pad 14, a superior operation feel is achieved by a blind operation, which allows an intuitive and free movement of the user finger.

The user is allowed to select a command only from among the candidate commands in the assignment change mode, while he/she is allowed to select from among all of the available commands in the candidate registration mode, which may take a longer determination time for determining the candidate commands. In view of such a situation, an operation of the touch pad 14 is prohibited in the candidate registration mode when the vehicle is traveling. More practically, switching of the display to the candidate registration mode is prohibited. Therefore, distracted driving, with one's concentration deteriorated and distracted away from the driving operation, is prevented.

(Second Embodiment)

Figure 9A:
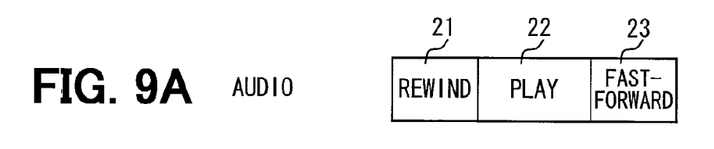
FIGS. 9A, 9B, 9C are illustrations of an assignment change mode with command combinations in a second embodiment of the present disclosure.
Figure 9B:
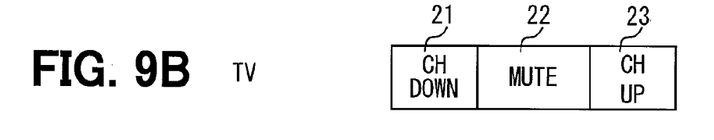
Figure 9C:
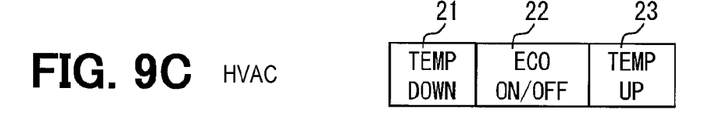

In the second embodiment, a combination of commands (i.e., command combination) are predetermined for each of the operation switches 11, 12, 13, and multiple combinations of predetermined commands are stored in a memory 17a (FIG. 1). With reference to FIGS. 9A to 9C, examples of three command combinations that are set in advance are illustrated. For ease of explanation, the illustration only shows the command combination as they may appear in the command slots 21, 22, 23, and does not show the entire display unit 20 and the remote operation apparatus 10.

FIG. 9A illustrates a combination of three audio device commands of "REWIND," "PLAY," and "FAST-FORWARD" assigned to the operation switches 11,12, 13. FIG. 9B illustrates a combination of three television commands of "CH DOWN" (i.e., channel down), "MUTE", and "CH UP" (i.e., channel up) assigned to the operation switches 11, 12, 13. FIG. 9C illustrates a combination of three air-conditioner commands of "TEMP DOWN" (i.e., temperature down), "ECO MODE ON/OFF," and "TEMP UP" (i.e., temperature up) assigned to the operation switches 11, 12, 13.

In the assignment change mode, which allows the change of the assigned commands to the operation switches 11, 12, 13, the user may select one of command combinations, such as the ones shown in FIGS. 9A to 9C, by using the touch pad 14. The user may generate different command combinations by using the touch pad 14 in the candidate registration mode.

Accordingly, frequently used command sets (i.e., combinations) are prepared as predetermined sets of commands, thereby simplifying the user operation for changing the command assignments, and effectively reducing a command selection time for selecting the assigned commands.

(Third Embodiment)

Figure 10A:
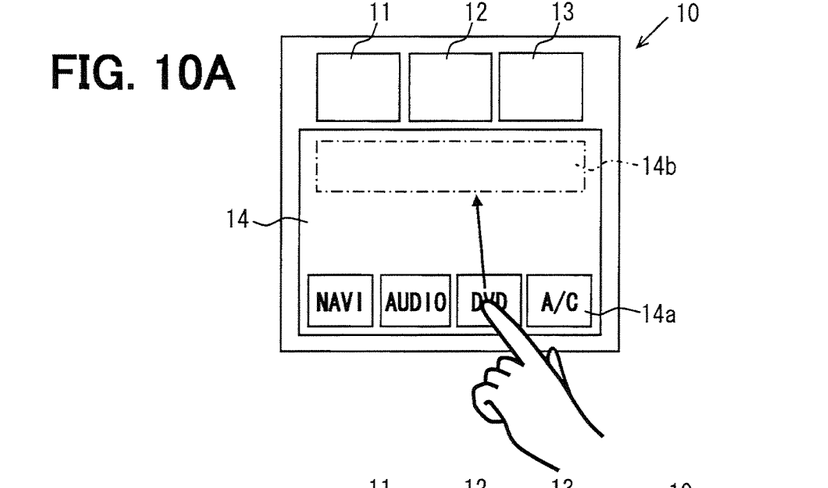
FIGS. 10A, 10B, 10C are illustrations of a remote control apparatus in a third embodiment of the present disclosure.

In the third embodiment, the touch pad 14 has a display function. For example, with reference to FIGS. 10A to 10C, information displayed on the candidate display area 26 and the command slots 21, 22, 23, which are displayed on the display unit 20, are also displayed in a display part 14a and in a display part 14b of the touch pad 14 in the assignment change mode.

Specifically, when the display part 14a displays commands that are not assigned to any one of the operation switches 11 to 13 (FIG. 10A), a flick operation of the user finger on one of the candidate commands leads to a desired operation switch, and allows the desired operation switch to be assigned a command of one of the candidate commands. That is, by putting the finger on a desired command (i.e., a DVD start command in the illustration) and by performing a flick operation to flick the desired command toward the desired operation switch (i.e., the operation switch 12 at a center in the row), the assigned command of the operation switch 12 is changed from a current one to the DVD start command.

Figure 10B:
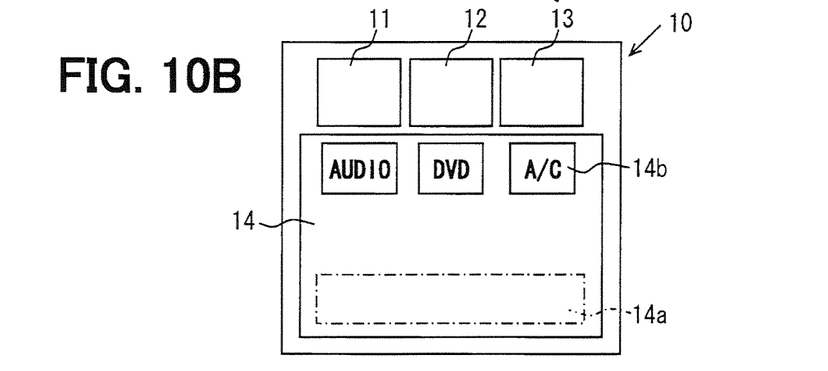
Figure 10C:
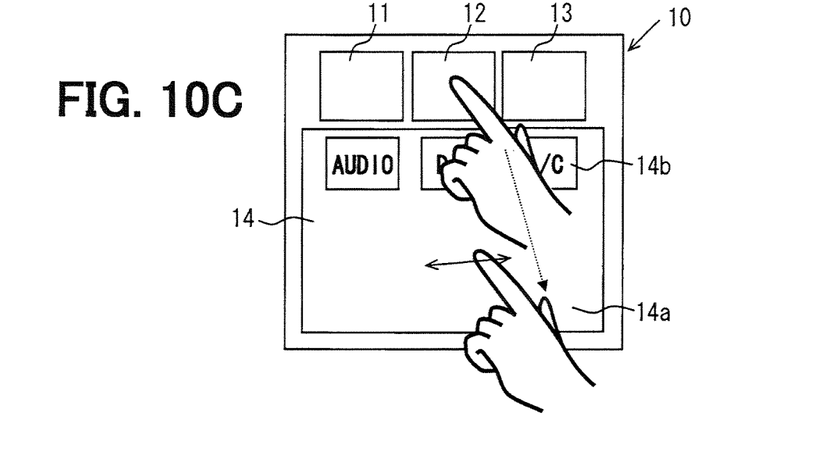

After the completion of the change operation, the assigned commands are displayed in the display part 14b (FIG. 10B). Then, in the normal display mode, the display of the display part 14a is finished and the display of the display unit 14b is kept unchanged (FIG. 10C).

According to the third embodiment, the assigned commands are displayed on the touch pad 14 in the normal display mode, allowing the user to visually recognize the assigned commands of the operation switches 11 to 13 while operating the operation switches 11, 12, 13. Further, since the candidate commands are displayed on the touch pad 14, the operability of the change operation on the touch pad 14 for changing the assigned command is improved.

(Fourth Embodiment)

Figure 11A:
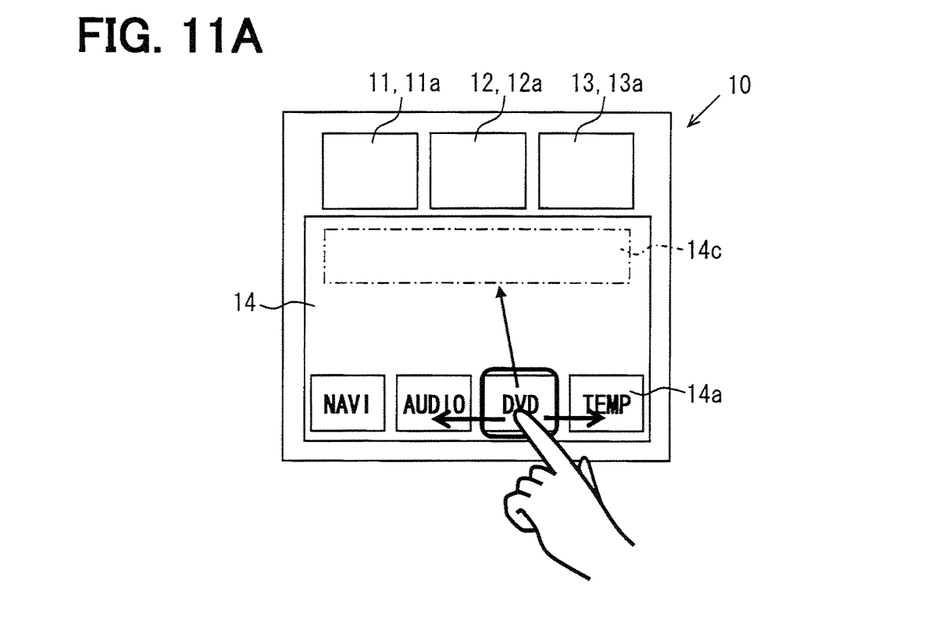
FIGS. 11A, 11B are illustrations of a remote control apparatus in a fourth embodiment of the present disclosure.
Figure 11B:
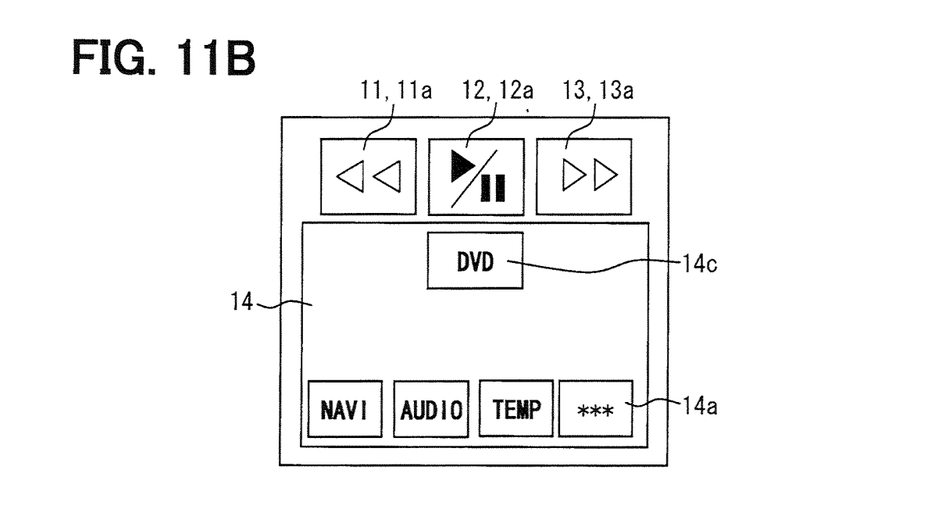

In the fourth embodiment, the touch pad 14 and the operation switches 11, 12, 13 have a display function. For example, with reference to FIGS. 11A and 11B, information displayed on the candidate display area 26 and the command slots 21, 22, 23, which are displayed on the display unit 20, are also displayed in the display part 14a and in a display part 14c of the touch pad 14 in the assignment change mode.

More practically, the contents of the display part 14b in the third embodiment are displayed in display parts 11a, 12a, 13a, which respectively correspond to the operation switches 11, 12, 13. Further, the display part 14c of the touch pad 14 displays the active device (i.e., a DVD of FIG. 11B).

According to the above control, the information displayed in the command slots 21, 22, 23 are also displayed in the display parts 11a, 12a, 13a corresponding to the operation switches 11, 12, 13. Therefore, the user is allowed to operate the operation switches 11, 12, 13 while visually recognizing the assigned commands displayed in the display parts 11a, 12e. 13a, thereby improving operability of the operation switches 11, 12, 13.

(Other Embodiments)

The present disclosure is not limited to the present disclosure, but may be changed in the following manner. The features of the various embodiments of the present disclosure may be arbitrarily combined to form further variations.

In each of the above embodiments, functions provided by the MPU 17 of the remote operation apparatus 10, to be serving as a display control unit for controlling the information displayed of the operation menu, may also be provided by a MPU of various in-vehicle devices 40 and a MPU of the display unit 20.

In each of the above embodiments, selection of the candidate commands and the change of command assignment performed by the touch pad 14 (i.e., a candidate selection operation unit, a command assignment operation unit in claims) may also be performed by other pointing devices such as a track ball, and a mouse. Further, an operation stick that is shaken/swung by the user, a direction switch that is tilted in four directions of up/down/right/left (i.e., a joystick-like device) and the like may also replace the touch pad 14.

In each of the above embodiments, selection of the candidate commands and the change of command assignment are performed by only one device, i.e., by the touch pad 14 (i.e., a candidate selection operation unit, a command assignment operation unit in claims). However, the candidate selection operation unit and the command assignment operation unit may be provided as two separate units. That is, one of the candidate selection operation unit may be provided as a touch pad, and the other may be provided as an operation stick.

In each of the above embodiments, the candidate registration mode and the assignment change mode are both displayed as the operation guidance for the user, which may be changed to a sound guidance or the like. That is, one or both of the two modes may be provided as a sound/voice operation guidance.

In the first embodiment, the commands assigned to the operation switches 11, 12, 13 come from the same/single menu level. For example, in a situation before starting any application, which is illustrated in FIG. 3A, only the application start commands are displayed and selectable as an assigned command, and in a situation after starting one application, which is illustrated in FIG. 3B, only the operation commands for the started application are displayed and selectable. However, the operation switches 11, 12, 13 may be configured to simultaneously have the assigned commands from different/various menu levels.

In each of the above embodiments, multiple operation switches 11, 12, 13 are provided. However, the operation switch may be provided as only one switch. Further, when the operation switches 11, 12, 13 respectively have the display function as shown in the fourth embodiment, the display function of the touch pad 14 may be dispensed with.

Such changes and modifications are to be understood as being within the scope of the present disclosure as defined by the appended claims.

What is claimed is:

1. An in-vehicle operation apparatus comprising:
   an operation switch operable by a user for controlling multiple in-vehicle devices;
   a candidate selection operation unit operable by the user for selecting a plurality of candidate commands from among a plurality of commands respectively for the in-vehicle devices;
   a command assignment operation unit operable by the user for selecting and assigning a desired command from among the plurality of candidate commands to the operation switch for having the operation switch control the in-vehicle device associated with the desired command;
   a display unit displaying at least one of a first operation screen and a second operation screen, wherein
   the first operation screen displays the plurality of commands from which the plurality of candidate commands is to be selected by the candidate selection operation unit,
   the second operation screen displays the plurality of candidate commands from which the desired command is to be selected and assigned to the operation switch by the command assignment operation unit;
   at least one of the candidate selection operation unit and the command assignment operation unit is a touch pad that detects a finger movement on an input plate of the touch pad, the touch pad being a separate device that is separately disposed from the operation switch,
   the display unit is disposed on an upward side of the operation switch,
   the operation switch is disposed on an upward side of the touch pad, and
   the touch pad, the operation switch and the display unit are arranged in a row along an up-down direction.

2. The in-vehicle operation apparatus of claim 1 wherein:
   the operation switch comprises
   a plurality of operation switches;
   the in-vehicle operation apparatus further comprising:
   a memory unit storing a plurality of command combinations for assigning a command to each of the plurality of operation switches, wherein
   the command assignment operation unit is operable to select and assign a desired command combination from among the plurality of command combinations for the plurality of operation switches.

3. The in-vehicle operation apparatus of claim 1, wherein the candidate selection operation unit is prohibited from selecting the plurality of candidate commands when a vehicle is traveling.

4. The in-vehicle operation apparatus of claim 3, wherein when the touch pad serving as the command assignment operation unit is operated, the display unit displays each of the assigned commands in respective command slots, and displays each of non-assigned commands in a candidate display area, and
   the candidate display area moves according to the operation switch that is selected by an input operation on the touch pad, moving the candidate display area adjacent to one of the command slots corresponding to the selected operation switch.

5. The in-vehicle operation apparatus of claim 1, wherein the operation switch comprises:
   a plurality of operation switches arranged in a row along a vehicle right-left direction,
   the display unit displays the plurality of commands assigned to the plurality of operation switches in a row arrangement, and
   the arrangement of the assigned commands is same as the arrangement of the plurality of operation switches along the vehicle right-left direction.

* * * * *